United States Patent
Wang et al.

(10) Patent No.: US 8,526,071 B2
(45) Date of Patent: Sep. 3, 2013

(54) IMAGE SCANNING DEVICE AND IMAGE SCANNING METHOD

(75) Inventors: Xian-Jun Wang, Suzhou (CN); Ming-Jie Zhao, Suzhou (CN); Jian-Chun Yu, Suzhou (CN)

(73) Assignee: Qisda (Suzhou) Co., Ltd, Suzhou, Jiangsu Province (CN)

( * ) Notice: Subject to any disclaimer, the term of this patent is extended or adjusted under 35 U.S.C. 154(b) by 641 days.

(21) Appl. No.: 12/783,709

(22) Filed: May 20, 2010

(65) Prior Publication Data

US 2011/0286059 A1    Nov. 24, 2011

(30) Foreign Application Priority Data

May 20, 2009 (CN) .......................... 2009 1 0145270

(51) Int. Cl.
*H04N 1/04* (2006.01)
(52) U.S. Cl.
USPC ............................ 358/474; 358/498; 358/487
(58) Field of Classification Search
USPC ................ 358/474, 487, 475, 509, 486, 497, 358/498
See application file for complete search history.

(56) References Cited

U.S. PATENT DOCUMENTS

| 4,598,323 | A | * | 7/1986 | Honjo et al. | 358/449 |
|---|---|---|---|---|---|
| 5,392,100 | A | * | 2/1995 | Yoshida | 399/211 |
| 5,515,182 | A | * | 5/1996 | Lehman et al. | 358/493 |
| 5,574,274 | A | * | 11/1996 | Rubley et al. | 250/208.1 |
| 5,673,125 | A | * | 9/1997 | Merecki et al. | 358/487 |
| 5,966,221 | A | * | 10/1999 | Tellam et al. | 358/475 |
| 6,256,117 | B1 | * | 7/2001 | Hsu et al. | 358/475 |
| 6,930,806 | B2 | * | 8/2005 | Han et al. | 358/497 |
| 7,236,270 | B2 | * | 6/2007 | Okamura | 358/406 |
| 7,378,644 | B2 | * | 5/2008 | Kubota et al. | 250/234 |
| 7,535,602 | B2 | * | 5/2009 | Ohara | 358/474 |
| 7,733,538 | B2 | * | 6/2010 | Kanesaka et al. | 358/474 |
| 8,038,140 | B2 | * | 10/2011 | Kimura et al. | 271/10.03 |
| 2006/0023266 | A1 | * | 2/2006 | Ohara | 358/474 |
| 2008/0049270 | A1 | * | 2/2008 | Oguchi | 358/474 |
| 2010/0039683 | A1 | | 2/2010 | Lv | |

FOREIGN PATENT DOCUMENTS

CN    101345806 A    1/2009

* cited by examiner

*Primary Examiner* — Negussie Worku

(57) ABSTRACT

An image scanning device and an image scanning method are provided. The invention is related to a miniaturized image scanning device and an image scanning method. The miniaturized image scanning device includes a housing, a first driving roller set, an entrance sensor, an image sensor, a reflective light source, a transmissive light source, and a control module. The housing has an entrance and an exit. The first driving roller set is disposed in the housing. The entrance sensor is disposed between the entrance and the first driving roller set. The image sensor, the reflective light source and the transmissive light source are disposed between the first driving roller set and the exit. The control module receives and processes signals outputted from the image sensor and the entrance sensor to control the operation of the image sensor, the first driving roller set, the reflective light source and the transmissive light source.

8 Claims, 4 Drawing Sheets

IMAGE SCANNING DEVICE AND IMAGE SCANNING METHOD

This application claims the benefit of People's Republic of China application Serial No. 200910145270.0, filed May 20, 2009, the subject matter of which is incorporated herein by reference.

BACKGROUND OF THE INVENTION

1. Field of the Invention

The invention relates in general to an image scanning device and an image scanning method, and more particularly to a miniaturized image scanning device and an image scanning method.

2. Description of the Related Art

Along with the advance in information technology, paperless office has become a trend. Normally, paper files are converted into electronic files by image scanning devices such as scanners. Current scanners have a transparent carriage platform on which the to-be-scanned object is placed. The image sensor scans the to-be-scanned object under the carriage platform. As the carriage platform must be larger than the to-be-scanned object, the current scanner is big in size and is inconvenient in terms of portability or used on the desktop where the space is limited. Thus, how to miniaturize the image scanning device has become an imminent issue to the manufacturers.

SUMMARY OF THE INVENTION

According to an object of the invention, a miniaturized image scanning device is provided. The miniaturized image scanning device includes a housing, a first driving roller set, an entrance sensor, an image sensor, a reflective light source and a transmissive light source, a control module, and a carriage holder. The housing has an entrance and an exit. The first driving roller set is disposed in the housing. The entrance sensor is disposed between the entrance and the first driving roller set. The image sensor, the reflective light source and the transmissive light source are disposed between the first driving roller set and the exit. The image sensor and the reflective light source are located on one side of the path from the entrance to the exit. The transmissive light source corresponds to the image sensor and is located on the other side of the path from the entrance to the exit. The control module is used for receiving and processing the signals outputted from the entrance sensor and the image sensor to control the operation of the image sensor, the first driving roller set, the reflective light source and the transmissive light source. The carriage holder has an information area and a holding area. The scan mode information is loaded in the information area. The image sensor obtains the scan mode information and sends it to the control module. The control module controls the scan mode or scan parameter of the image scanning device according to the scan mode information.

Alternatively, the image scanning device includes a second driving roller set disposed between the image sensor and the exit, wherein the control module controls the operation of the second driving roller set.

Alternatively, the image sensor is a contact image sensor (CIS), wherein the image sensor and the reflective light source are located in an image sensing module.

Alternatively, the first driving roller set includes a driving roller and a compressing roller.

Alternatively, the information area has barcode.

According to another object of the invention, an image scanning method including the following steps is provided.

Step 1: Providing the image scanning device as disclosed in claim 1;

Step 2: Sensing the to-be-scanned object outputted from the entrance by the entrance sensor;

Step 3: Guiding the to-be-scanned object to move towards the exit by the first driving roller set; activating the reflective light source or the transmissive light source; obtaining the image information of the to-be-scanned object by the image sensor.

Alternatively, the image scanning method includes the steps of holding the to-be-scanned object by the holding area of the carriage holder; disposing the carriage holder in the entrance.

Alternatively, the image scanning method includes the steps of obtaining the scan mode information and sending it to the control module by the image sensor; controlling the scan mode or scan parameter of the image scanning device according to the scan mode information by the control module.

Compared with the current technology, the scanning device of the invention does not require the carriage platform to be larger than the to-be-scanned object, so the volume can be further reduced. Meanwhile, the scan mode or scan parameter can be automatically identified for the convenience of use.

The invention will become apparent from the following detailed description of the preferred but non-limiting embodiments. The following description is made with reference to the accompanying drawings.

DETAILED DESCRIPTION OF THE INVENTION

Figure 1:
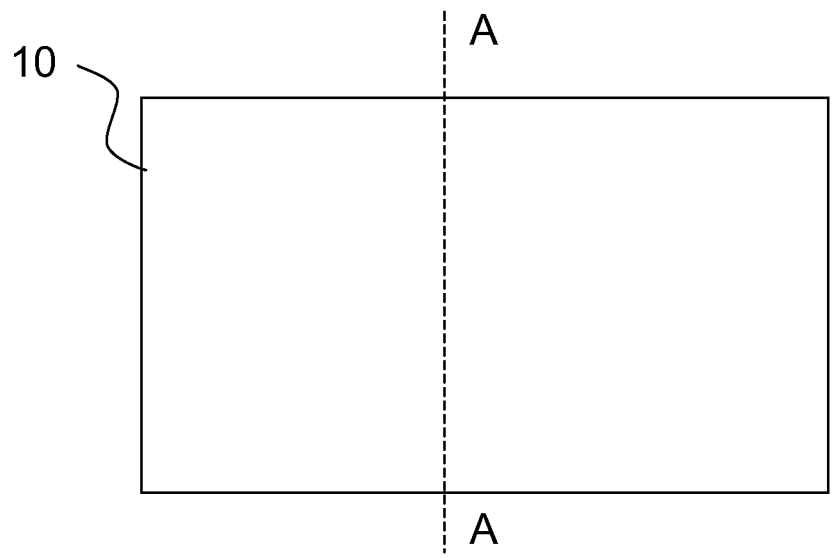
FIG. 1 shows a top view of an image scanning device according to a first embodiment of the invention.
Figure 2:
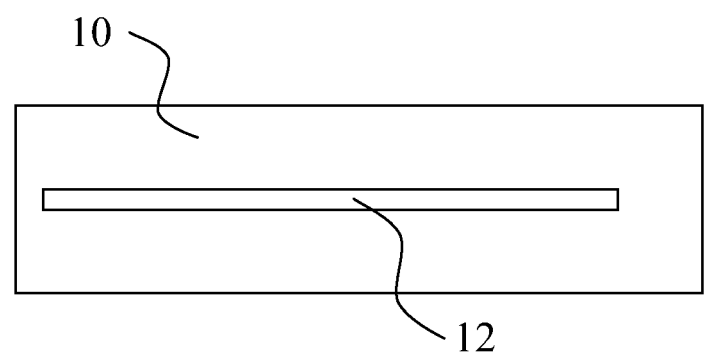
FIG. 2 shows a front view of the image scanning device of FIG. 1.
Figure 3:
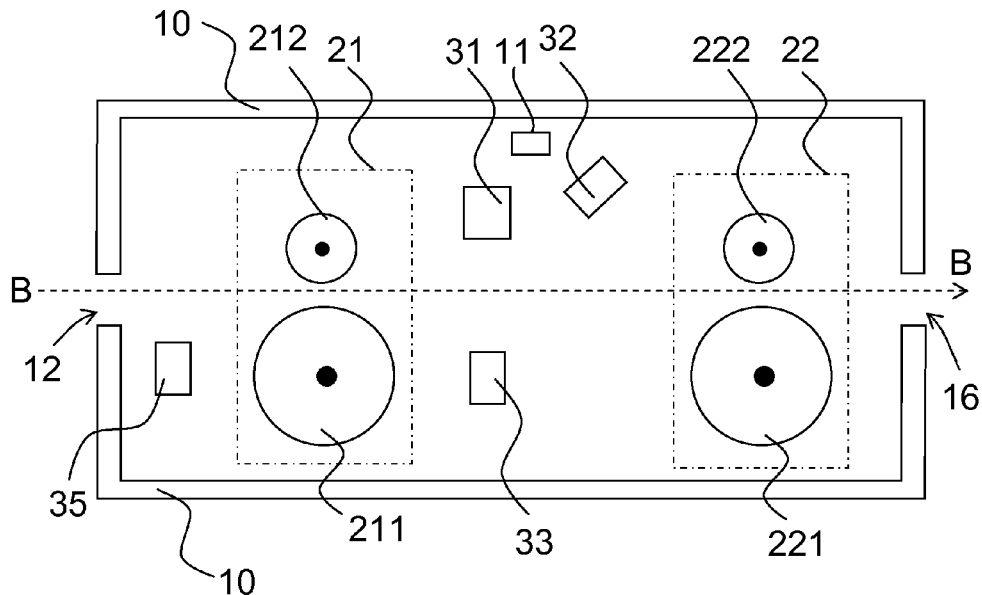
FIG. 3 shows a cross-sectional view the image scanning device of FIG. 1 along a cross-sectional line AA.

FIG. 1 shows a top view of an image scanning device according to a first embodiment of the invention. FIG. 2 shows a front view of the image scanning device of FIG. 1. FIG. 3 shows a cross-sectional view the image scanning device of FIG. 1 along a cross-sectional line AA. As indicated in FIGS. 1~3, the image scanning device of the present embodiment of the invention includes a housing 10, a first driving roller set 21, an entrance sensor 35, an image sensor 31, a reflective light source 32, a transmissive light source 33, and a control module 11. The housing 10 has an entrance 12 and an exit 16. The first driving roller set 21 is disposed in the housing and includes a driving roller 211 and a compressing roller 212. The entrance sensor 35 is disposed between the entrance 12 and the first driving roller set 21, wherein the entrance sensor 35 can adopt an object sensor of the current technology including an infrared sensor. The image sensor 31, the reflective light source 32 and the transmissive light source 33 are disposed between the first driving roller set 21 and the exit 16, wherein the image sensor 31 and the reflective light source 32 are located on one side of the path BB from the entrance 12 to the exit 16, and the transmissive light source 33 corresponds to the image sensor 31 and is located on the other side of the path BB from the entrance 12 to the exit 16. The control module 11 receives and processes the signals outputted from the entrance sensor 35 and the image sensor 31 to control the operation of the image sensor 31, the first driving roller set 21, the reflective light source 32 and the transmissive light source 33.

The image scanning device of the first embodiment further includes a second driving roller set 22 disposed between the image sensor 31 and the exit 16, wherein the second driving roller set 22 includes a driving roller 221 and a compressing roller 222. The second driving roller set 22 enables the to-be-scanned object to shift in the image scanning device more smoothly.

In the present embodiment of the invention, the image sensor 31 is a contact image sensor (CIS). The image sensor 31 and the reflective light source 32 can be integrated in an image sensing module for the convenience of assembly.

Figure 4:
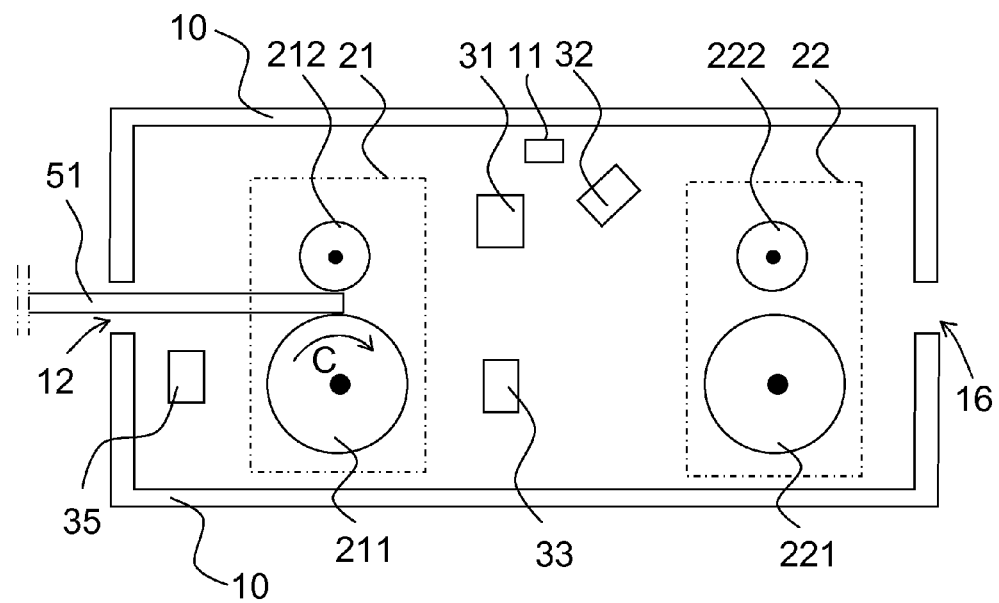
FIGS. 4~6 show the process of scanning a reflective document by the image scanning device of FIG. 1.
Figure 5:
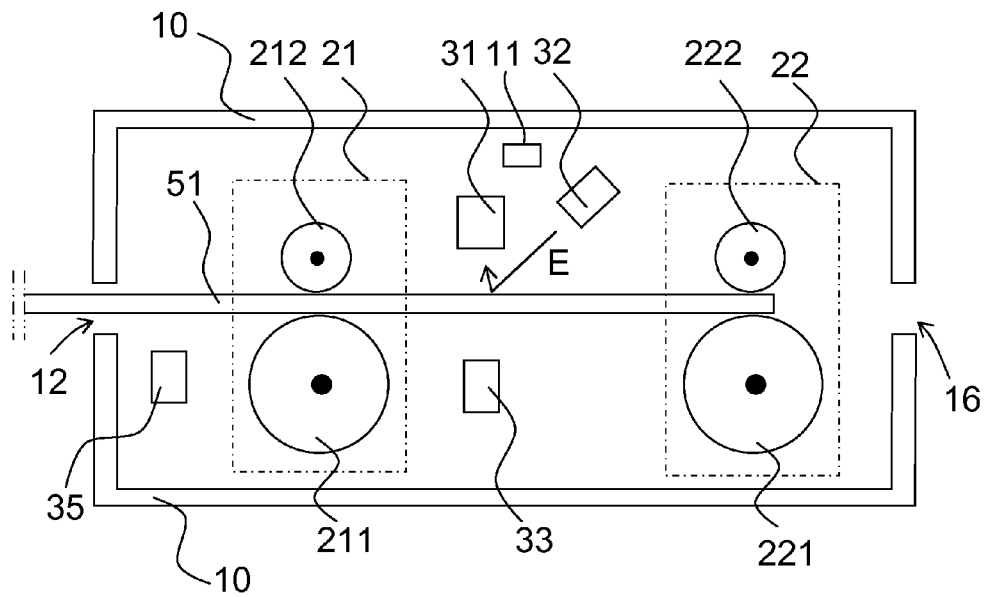
Figure 6:
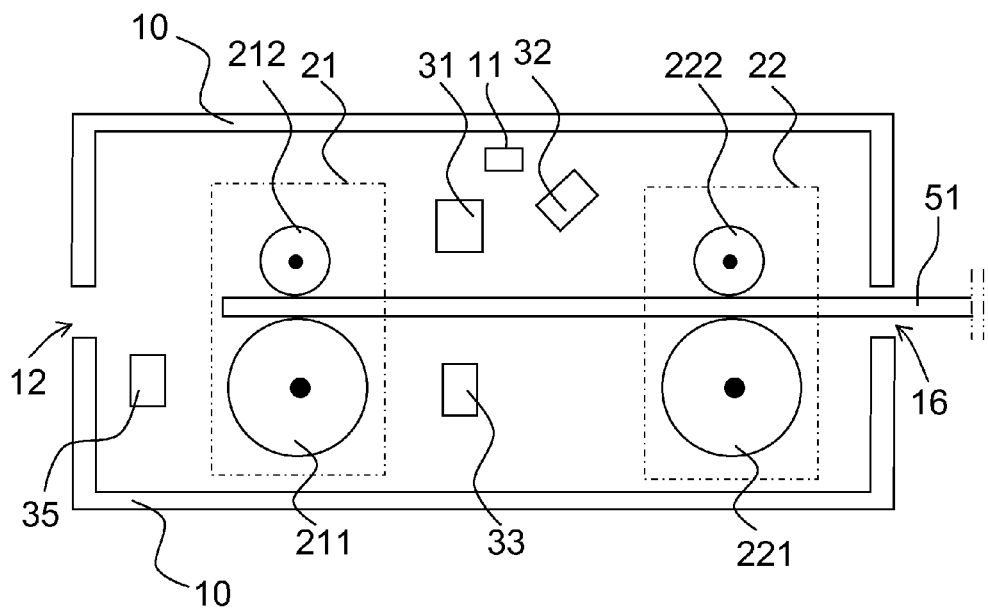

FIGS. 4~6 show the process of scanning a reflective document by the image scanning device of FIG. 1. The method of scanning a to-be-scanned object by the image scanning device of the invention is disclosed below with accompanying drawings of FIGS. 4~6.

Step 1: An image scanning device is provided as indicated in FIG. 1;

step 2: The to-be-scanned object 51 outputted from the entrance 12 is sensed by the entrance sensor 35, and if the entrance sensor 35 detects that the to-be-scanned object 51 has entered the entrance 12, then the entrance sensor 35 will send an object-having-entered signal to the control module.

Step 3: As indicated in FIG. 4, the first driving roller set 21 is activated by the control module 11 according to object-having-entered signal, and the first driving roller 211 is rotated along the direction of the arrow C to guide the to-be-scanned object 51 to shift towards the exit 16; as indicated in FIG. 5, the control module 11 further selectively activate the reflective light source 32 according to the attribute (reflective document) of the to-be-scanned object 51, wherein the light emitted from the reflective light source 32 is reflected to image sensor 31 along the direction of the arrow E; the control module 11 obtains the image information of the to-be-scanned object by the image sensor 31. Lastly, the to-be-scanned object 51 will leave the image scanning device from the exit 16 as indicated in FIG. 6.

Figure 7:
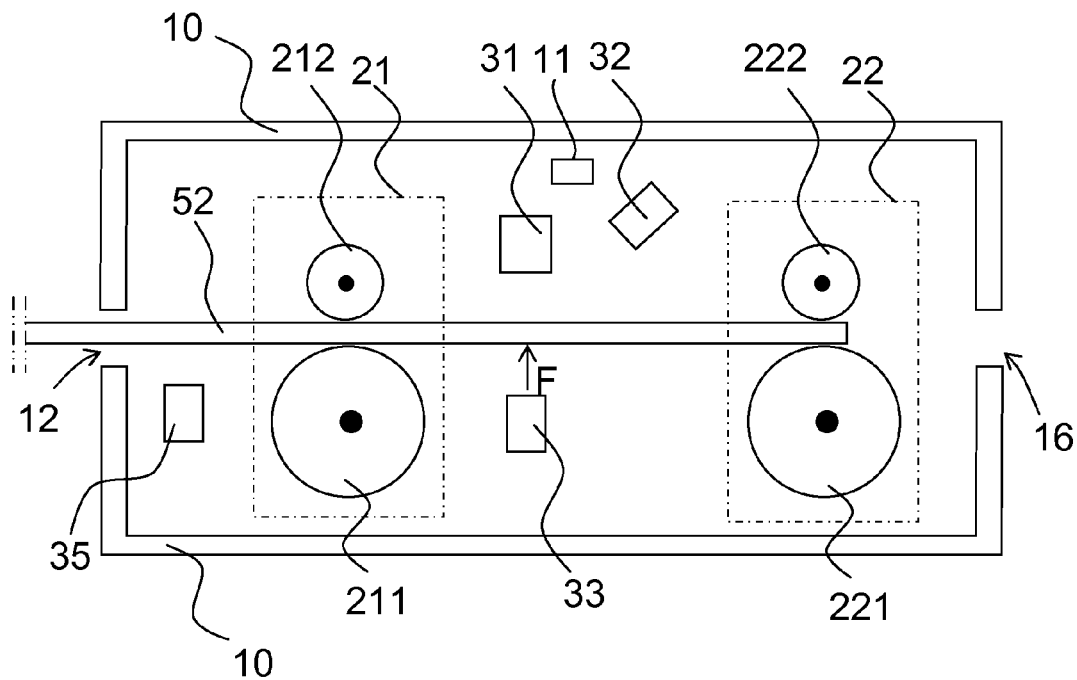
FIG. 7 shows the image scanning device of FIG. 1 scanning a transmissive document.

FIG. 7 shows the image scanning device of FIG. 1 scanning a transmissive document. The difference between scanning the transmissive document 52 through which the light can pass (such as the film) and scanning the to-be-scanned object 51 (the reflective document) is that the control module 11 selects to activate the transmissive light source 33 rather than the reflective light source 32. The light emitted by the transmissive light source 33 passes through the transmissive document 52 along the direction of the arrow F to reach the image sensor 31.

Figure 8:
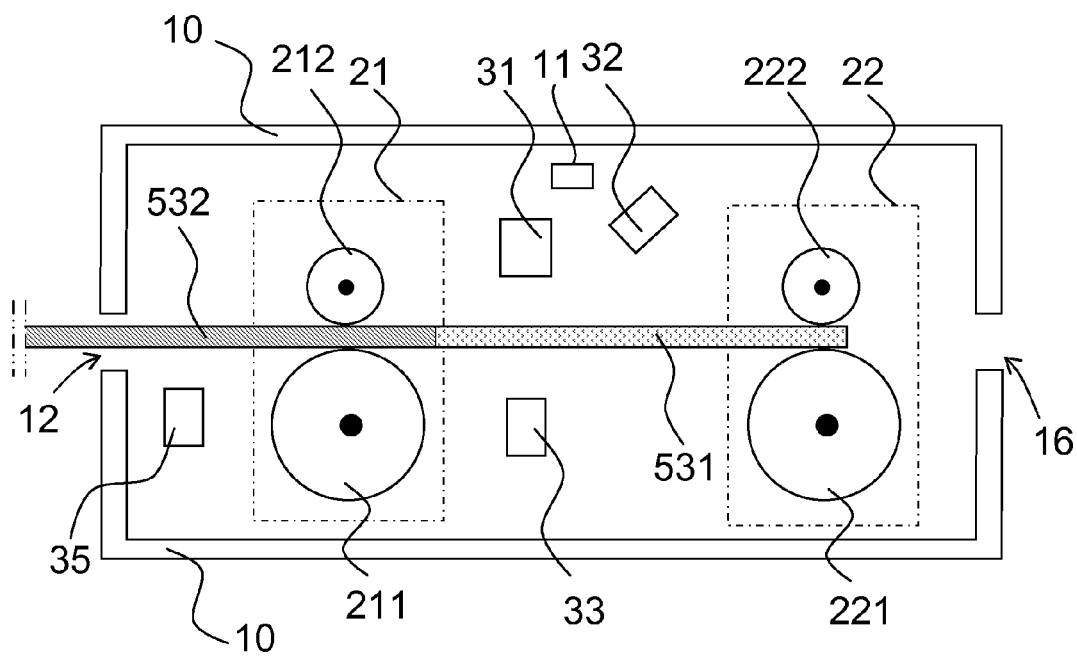
FIG. 8 shows the image scanning device of FIG. 1 scanning a to-be-scanned object held by a carriage holder.

The image scanning device of the invention may further include a carriage holder. The carriage holder can be formed by two transparent plastic films, wherein the to-be-scanned object is held between the two transparent plastic films. FIG. 8 shows the image scanning device of FIG. 1 scanning a to-be-scanned object held by a carriage holder. As indicated in FIG. 8, the carriage holder has a message area 531 and a holding area 532, wherein scan mode information is loaded in the information area and can be denoted by barcode. Compared with the ordinary method of scanning a to-be-scanned object, the method of scanning a to-be-scanned object held by a carriage holder further includes the steps of holding the to-be-scanned object (not illustrated) by the holding area 532 of the carriage holder; disposing the carriage holder in the entrance 12; obtaining and sending the scan mode information loaded in the information area 531 to the control module 11 by the image sensor 31; controlling the scan mode or scan parameter of the image scanning device according to the scan mode information by the control module 11. Examples of the scan mode information include scan resolution level and the attributes of the to-be-scanned object (such as the reflective document or the transmissive document). Examples of the scan mode of the image scanning device include grey scan mode, reflective document scan mode and transmissive document scan mode. Examples of the scan parameter of the image scanning device include high resolution level, low resolution level, and so on.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image scanning device, comprising:
a housing with an entrance and an exit;
a first driving roller set disposed in the housing;
an entrance sensor disposed between the entrance and the first driving roller set;
an image sensor, a reflective light source and a transmissive light source disposed between the first driving roller set and the exit, wherein the image sensor and the reflective light source are located on one side of the path from the entrance to the exit, and the transmissive light source corresponds to the image sensor and located on the other side of the path from the entrance to the exit;
a control module, wherein the control module is used for receiving and processing the signals outputted from the entrance sensor and the image sensor to control the operation of the image sensor, the first driving roller set, the reflective light source and the transmissive light source;
a carriage holder formed by two transparent plastic films, wherein a to-be-scanned object is held between the two transparent plastic films, and the carriage holder has a message area and a holding area, the information area is loaded with scan mode information; the image sensor obtains and sends the scan mode information to the control module, and the control module controls the scan mode or scan parameter of the image scanning device according to the scan mode information.

2. The image scanning device according to claim 1, comprising a second driving roller set disposed between the image sensor and the exit, wherein the control module is used for controlling the operation of the second driving roller set.

3. The image scanning device according to claim 1, wherein the image sensor is a contact image sensor (CIS).

4. The image scanning device according to claim 3, wherein the image sensor and the reflective light source is located in an image sensing module.

5. The image scanning device according to claim 1, wherein the first driving roller set comprises a driving roller and a compressing roller.

6. The image scanning device according to claim 1, wherein the information area has barcode.

7. An image scanning method, comprising:
- step 1: providing an image scanning device as disclosed in claim 1;
- step 2: holding the to-be-scanned object by the holding area of the carriage holder, wherein the to-be-scanned object is held between the two transparent plastic films;
- step 3: disposing the carriage holder in the entrance;
- step 4: sensing the to-be-scanned object outputted from the entrance by the entrance sensor;
- step 5: guiding the to-be-scanned object to move towards the exit by the first driving roller set; activating the reflective light source or the transmissive light source; obtaining the image information of the to-be-scanned object by the image sensor.

8. The image scanning method according to claim 7, comprising:
- obtaining and sending the scan mode information to the control module by the image sensor;
- controlling the scan mode or scan parameter of the image scanning device according to the scan mode information by the control module.

* * * * *